US011618428B2

(12) United States Patent
Nishiyabu

(10) Patent No.: US 11,618,428 B2
(45) Date of Patent: Apr. 4, 2023

(54) ELECTRIC SUPERCHARGER-EQUIPPED MOVING MACHINE

(71) Applicant: KAWASAKI MOTORS, LTD., Akashi (JP)

(72) Inventor: Masaki Nishiyabu, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 115 days.

(21) Appl. No.: 17/172,412

(22) Filed: Feb. 10, 2021

(65) Prior Publication Data

US 2021/0284125 A1 Sep. 16, 2021

(30) Foreign Application Priority Data

Mar. 10, 2020 (JP) .............................. JP2020-040838

(51) Int. Cl.
*B60K 6/48* (2007.10)
*B60W 10/06* (2006.01)
*B60W 10/08* (2006.01)
*B60W 20/40* (2016.01)

(52) U.S. Cl.
CPC ............ *B60W 10/06* (2013.01); *B60W 10/08* (2013.01); *B60W 20/40* (2013.01); *B60W 2710/0638* (2013.01)

(58) Field of Classification Search
CPC ........ Y02T 10/12; Y02T 10/62; B60W 20/00; B60W 20/10; B60W 20/40; B60W 20/30; B60W 20/20; B60W 2710/0638; B60W 2510/02; B60W 2510/0208;
(Continued)

(56) References Cited

U.S. PATENT DOCUMENTS

| 8,087,401 | B2 * | 1/2012 | Inoue | ..................... | F02B 33/40 |
| | | | | | 123/559.3 |
| 2008/0318729 | A1 * | 12/2008 | Asao | ..................... | B60K 6/485 |
| | | | | | 477/5 |

(Continued)

FOREIGN PATENT DOCUMENTS

| EP | 2181259 A2 | 5/2010 |
| EP | 2573356 A2 * | 3/2013 | ............ F02B 37/004 |

(Continued)

*Primary Examiner* — George C Jin
*Assistant Examiner* — Teuta B Holbrook
(74) *Attorney, Agent, or Firm* — Alleman Hall Creasman & Tuttle LLP

(57) ABSTRACT

An electric supercharger-equipped moving machine includes: an engine; a supercharger configured to increase intake pressure of the engine; an electric motor including a motor driving shaft; a power transmitting path including a power transmitting shaft through which driving power of the engine is transmitted to a propulsive power generating body; and a switching clutch configured to be able to block power transmission from the electric motor to the power transmitting shaft. The motor driving shaft is connected to the supercharger so as to be able to drive the supercharger when the switching clutch is in a disengaged state. The motor driving shaft is connected to the power transmitting shaft so as to be able to drive the propulsive power generating body when the switching clutch is in an engaged state.

19 Claims, 6 Drawing Sheets

(58) Field of Classification Search
CPC ......... B60W 2710/021; B60W 2710/02; F02D 41/0007; F02D 41/022; B60K 6/48
See application file for complete search history.

(56) References Cited

U.S. PATENT DOCUMENTS

| | | | |
|---|---|---|---|
| 2010/0155157 A1* | 6/2010 | Grieve .................... | F02B 33/36 903/905 |
| 2012/0137681 A1* | 6/2012 | Hoess .................... | F02B 37/10 903/902 |
| 2014/0238361 A1* | 8/2014 | Tsourapas ............... | F02B 39/10 123/559.3 |
| 2015/0361905 A1* | 12/2015 | Löfgren .................. | B60K 6/24 417/34 |
| 2016/0047298 A1* | 2/2016 | Löfgren ................ | F01N 11/002 60/273 |
| 2017/0008512 A1* | 1/2017 | Yukawa ................. | F02D 23/00 |
| 2017/0152801 A1* | 6/2017 | Löfgren ................ | F02N 11/003 |

FOREIGN PATENT DOCUMENTS

| | | |
|---|---|---|
| EP | 3094843 A1 | 11/2016 |
| EP | 3604061 A1 | 2/2020 |
| WO | 2005085611 A1 | 9/2005 |

\* cited by examiner

ENGINE SUPERCHARGING MODE

ENGINE START MODE/ELECTRICITY GENERATION MODE

ELECTRIC SUPERCHARGER-EQUIPPED MOVING MACHINE

CROSS-REFERENCE TO RELATED APPLICATION

This application claims priority to and the benefit of Japanese Patent Application No. 2020-040838 filed on Mar. 10, 2020, the entire disclosure of which is incorporated herein by reference.

BACKGROUND OF THE INVENTION

Field of the Invention

The present disclosure relates to a moving machine including an electric supercharger in order to improve engine output.

Description of the Related Art

Known is a technique in which in order to improve output of an engine mounted on a vehicle, the vehicle is equipped with an electric supercharger driven by an electric motor to increase intake pressure of the engine (see International Publication No. 2005/085611, for example).

However, according to the moving machine equipped with the electric supercharger, since the number of parts mounted on the moving machine increases, the weight increases, and the degree of freedom of the layout of the parts deteriorates.

SUMMARY OF THE INVENTION

An electric supercharger-equipped moving machine according to one aspect of the present disclosure includes: an engine; a supercharger configured to increase intake pressure of the engine; an electric motor including a motor driving shaft; a power transmitting path including a power transmitting shaft through which driving power of the engine is transmitted to a propulsive power generating body; and a switching clutch configured to be able to block power transmission from the electric motor to the power transmitting shaft. The motor driving shaft is connected to the supercharger so as to be able to drive the supercharger when the switching clutch is in a disengaged state. The motor driving shaft is connected to the power transmitting shaft so as to be able to drive the propulsive power generating body when the switching clutch is in an engaged state.

According to the above configuration, in the engine supercharging mode in which the intake pressure of the engine is increased by the supercharger, the power generated by the electric motor is not transmitted to the power transmitting shaft by the switching clutch, and the supercharger is appropriately driven. On the other hand, in the electric traveling mode in which the electric motor is utilized as a traveling drive source, the power of the electric motor is transmitted to the power transmitting shaft through the switching clutch, and the driving power of the electric motor is transmitted to the propulsive power generating body. Therefore, in the electric supercharger-equipped moving machine, since the electric motor which drives the supercharger also serves as the traveling drive source, the increase in weight and the deterioration of the degree of freedom of the layout can be suppressed. It should be noted that: when the moving machine is a vehicle, the propulsive power generating body is a driving wheel; and when the moving machine is a personal watercraft, the propulsive power generating body is a jet pump.

DESCRIPTION OF THE PREFERRED EMBODIMENTS

Hereinafter, embodiments will be described with reference to the drawings.

Embodiment 1

Figure 1:
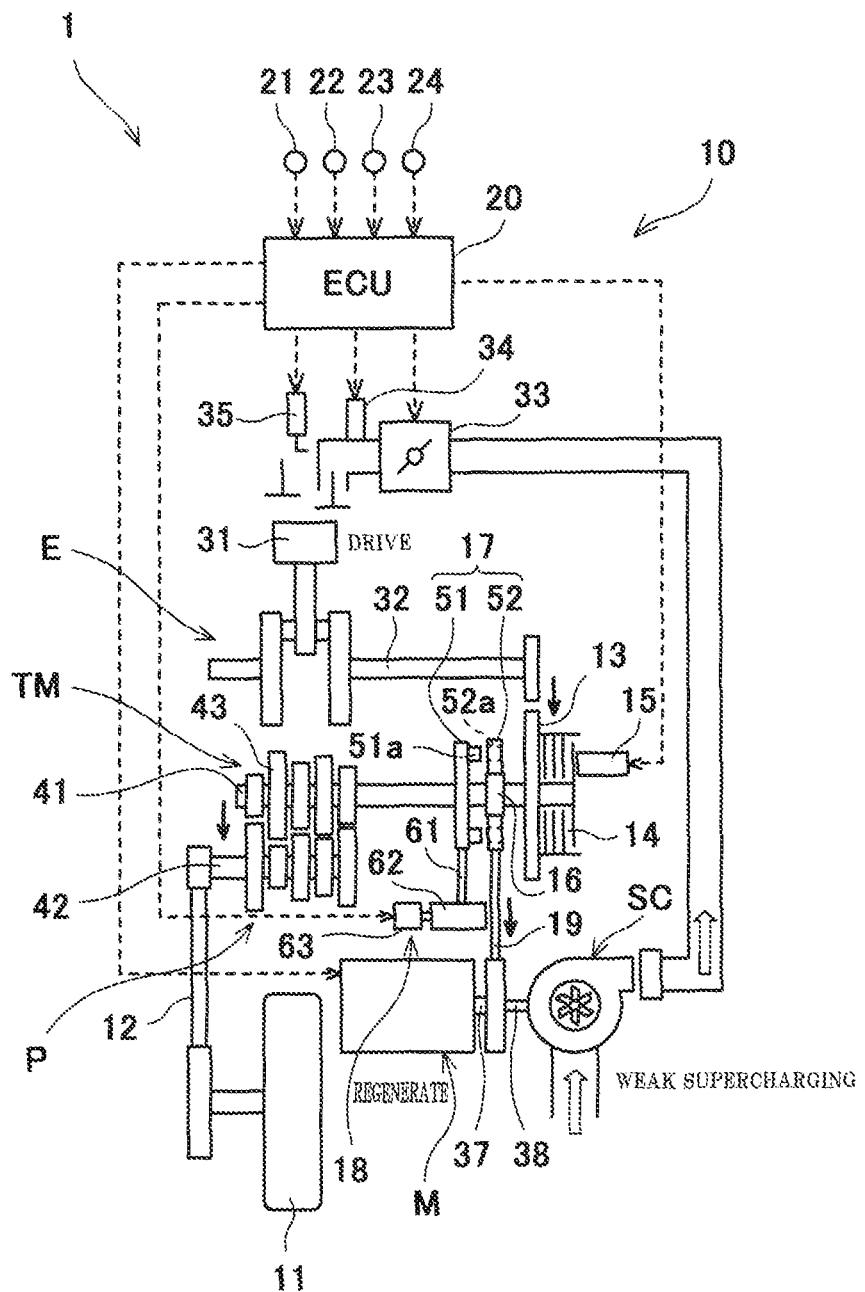
FIG. 1 is a schematic diagram showing a normal engine mode of a traveling drive system of an electric supercharger-equipped moving machine according to Embodiment 1.

FIG. 1 is a schematic diagram showing a normal engine mode of a traveling drive system 10 of an electric supercharger-equipped moving machine 1 according to Embodiment 1. As shown in FIG. 1, the moving machine 1 according to Embodiment 1 is a parallel hybrid vehicle on which an electric supercharger SC is mounted. Examples of the moving machine 1 include: a straddle-type vehicle (a motorcycle, for example) on which a rider rides; and a four-wheeled utility vehicle which travels on irregular ground.

The traveling drive system 10 of the moving machine 1 includes an engine E, the supercharger SC, and an electric motor M. The engine E is an internal combustion engine. The engine E serves as a traveling drive source which drives a driving wheel 11 (propulsive power generating body) and also serves as an electricity generator drive source. The engine E includes a piston 31 and a crank shaft 32. The crank shaft 32 rotates in accordance with reciprocation of the piston 31.

The engine E is provided with a throttle device 33, a fuel injection device 34, and an ignition device 35. An intake amount, a fuel supply amount, and an ignition timing are adjusted by controlling the throttle device 33, the fuel injection device 34, and the ignition device 35, and with this, the output of the engine E is adjusted. The supercharger SC includes a supercharger input shaft 38 to which power is input from the outside. When the supercharger input shaft 38 is driven, the supercharger SC increases intake pressure of the engine E.

The electric motor M includes a motor driving shaft 37 which outputs driving power generated by the electric motor M. The electric motor M serves as the traveling drive source which drives the driving wheel 11 and also serves as a supercharger power source which drives the supercharger SC. Moreover, the electric motor M serves as an electricity generator which generates electricity by the power from the engine E or the driving wheel 11.

The moving machine 1 includes a transmission device TM which changes the speed of rotational power output from the engine E and/or the electric motor M and transmits the power to the driving wheel 11. The transmission device TM is, for example, a manual transmission device which changes the speed in mechanical association with a manual operation of the driver. The transmission device TM includes an input shaft 41 (power transmitting shaft), an output shaft 42, and a transmission gear train 43. The driving power output from the engine E and/or the electric motor M is input to the input shaft 41. The transmission gear train 43 changes the speed of the rotation of the input shaft 41 based on a change gear ratio selected alternatively and transmits the rotation to the output shaft 42. The output shaft 42 outputs the rotational power, which has been changed in speed by the transmission gear train 43, to a driving wheel 2 through an output transmitting member 12 (a chain or a belt, for example).

The driving power of the crank shaft 32 of the engine E is input to the input shaft 41 through a primary reduction gear 13 and a main clutch 14 (friction clutch). The main clutch 14 is operated by a main clutch actuator 15 and cuts or establishes a power transmitting path from the crank shaft 32 to the input shaft 41. The crank shaft 32, the primary reduction gear 13, the main clutch 14, the transmission device TM, and the output transmitting member 12 constitute a power transmitting path P through which the driving power of the engine E is transmitted to the driving wheel 11.

The motor driving shaft 37 of the electric motor M is connected to the supercharger input shaft 38 of the supercharger SC. To be specific, the supercharger input shaft 38 rotates in association with the rotation of the motor driving shaft 37. The motor driving shaft 37 is connected to the input shaft 41 through a one-way clutch 16. The one-way clutch 16 blocks power transmission from the motor driving shaft 37 to the input shaft 41 and allows power transmission from the input shaft 41 to the motor driving shaft 37.

The one-way clutch 16 includes an inner ring and an outer ring. The inner ring of the one-way clutch 16 is externally fitted to the input shaft 41 so as to rotate together with the input shaft 41. The one-way clutch 16 allows the power transmission from the inner ring to the outer ring and blocks the power transmission from the outer ring to the inner ring. The outer ring of the one-way clutch 16 is connected to the motor driving shaft 37 through a power transmitting mechanism 19 (a gear mechanism, a chain-sprocket mechanism, or a belt-pulley mechanism, for example).

The input shaft 41 is provided with a switching clutch 17 which blocks or allows the power transmission from the electric motor M to the input shaft 41. As one example, the switching clutch 17 of the present embodiment is a dog clutch. The switching clutch 17 includes a first rotating body 51 and a second rotating body 52. The first rotating body 51 is connected to the input shaft 41 so as to rotate together with the input shaft 41 about an axis of the input shaft 41 and slide relative to the input shaft 41 in an axial direction of the input shaft 41. The second rotating body 52 is adjacent to the first rotating body 51 and is connected to the outer ring of the one-way clutch 16 so as to rotate together with the outer ring of the one-way clutch 16 about the axis of the input shaft 41.

The first rotating body 51 includes an engaging portion 51a (dog) projecting toward the second rotating body 52. The second rotating body 52 includes an engaged portion 52a (dog hole) corresponding to the engaging portion 51a of the first rotating body 51. When the first rotating body 51 slides on the input shaft 41 to approach the second rotating body 52, and with this, the engaging portion 51a of the first rotating body 51 engages with the engaged portion 52a of the second rotating body 52, the second rotating body 52 also rotates together with the input shaft 41 by the first rotating body 51 which rotates together with the input shaft 41. To be specific, the switching clutch 17 connects, while bypassing the one-way clutch 16, the input shaft 41 to the power transmitting mechanism 19 such that two-way power transmission between the input shaft 41 and the power transmitting mechanism 19 is realized.

When the switching clutch 17 is in a disengaged state, the driving power from the motor driving shaft 37 through the power transmitting mechanism 19 to the input shaft 41 is blocked by the one-way clutch 16, and most of the driving power of the motor driving shaft 37 is transmitted to the supercharger input shaft 38. When the switching clutch 17 is in an engaged state, the driving power of the motor driving shaft 37 is input to the input shaft 41 through the power transmitting mechanism 19 and the switching clutch 17. Thus, the electric motor M can drive the driving wheel 11.

The switching clutch 17 is operated by a switching clutch actuator 18. To be specific, by the driving power of the switching clutch actuator 18, the first rotating body 51 slides relative to the second rotating body 52 in the axial direction of the input shaft 41. The switching clutch actuator 18 includes, for example, a shift fork 61, a shift drum 62, and a rotary motor 63. The shift fork 61 engages with the first rotating body 51 so as not to be displaceable relative to the first rotating body 51 in the axial direction of the input shaft 41. The shift drum 62 guides the shift fork 61 such that the shift fork 61 is displaced in the axial direction of the input shaft 41. The rotary motor 63 rotates the shift drum 62.

A controller 20 is electrically connected to the engine E (the throttle device 33, the fuel injection device 34, and the ignition device 35), the electric motor M, the main clutch actuator 15, and the switching clutch actuator 18. The controller 20 is electrically connected to an accelerator operation amount sensor 21, an engine rotational frequency sensor 22, a vehicle speed sensor 23, a user input sensor 24, and the like.

The accelerator operation amount sensor 21 detects an accelerator operation amount (acceleration request amount) of the driver. The engine rotational frequency sensor 22 detects the rotational frequency of the engine E. The vehicle speed sensor 23 detects the traveling speed of the moving machine 1. The user input sensor 24 detects a predetermined selection input (a mode switching command, for example) from the driver or the like.

The controller 20 includes a processor, a storage, and an I/O interface. The controller 20 controls the engine E, the electric motor M, the main clutch actuator 15, and the switching clutch actuator 18 in such a manner that the processor refers to information acquired from the sensors 21 to 24 and the like and performs calculation processing in accordance with a program stored in the storage. It should be noted that the controller 20 may be constituted by a single ECU or a plurality of distributed ECUs.

The controller 20 determines a driving mode of the moving machine 1 based on a mode selection command input from the user input sensor 24. Then, the controller 20 controls the engine E, the electric motor M, the main clutch actuator 15, and the switching clutch actuator 18 in accordance with the determined driving mode.

It should be noted that the mode selection command does not have to be input from the user input sensor 24 and may be generated by the controller 20 itself. To be specific, the controller 20 may automatically generate the mode selection command based on vehicle states (for example, the rotational frequency of the engine, the traveling speed, a traveling acceleration degree, a gear stage, and a battery remaining amount) and/or driver operation states (for example, the accelerator operation amount, a brake operation amount, and a steering amount).

Next, the types of the driving modes will be described. As the driving modes, there are a normal engine mode, an engine supercharging mode, a HEV mode, an EV mode, an engine start mode, and an electricity generation mode. Hereinafter, these modes will be described with reference to FIGS. 1 to 5 in order.

FIG. 1 shows the normal engine mode. As shown in FIG. 1, in the normal engine mode, the controller 20 controls the main clutch actuator 15 to make the main clutch 14 become an engaged state, controls the switching clutch actuator 18 to make the switching clutch 17 become the disengaged state, controls the engine E to make the engine E become a driving state based on a detected value of the accelerator operation amount sensor 21, and controls the electric motor M to make the electric motor M become a regenerating state. It should be noted that the control of the main clutch actuator 15 when the engine E is driven in each mode may be automatic control or may be performed in accordance with a clutch operation of the driver. The rotational frequency of the engine E is, for example, less than 12,000 rpm.

With this, the driving power of the engine E is transmitted to the driving wheel 11 through the primary reduction gear 13, the main clutch 14, the input shaft 41, the transmission gear train 43, the output shaft 42, and the output transmitting member 12. Moreover, the rotational power of the input shaft 41 is transmitted to the motor driving shaft 37 through the one-way clutch 16 and the power transmitting mechanism 19, and with this, the electric motor M serves as an electricity generator (regeneration). The rotation of the motor driving shaft 37 is also transmitted to the supercharger input shaft 38. However, since the rotational frequency of the motor driving shaft 37 and the rotational frequency of the supercharger input shaft 38 are not high (less than 5,500 rpm, for example), the supercharger SC performs weak supercharging. It should be noted that a relief valve configured to release pressure which exceeds a threshold may be provided at a channel located upstream or downstream of the supercharger.

Figure 2:
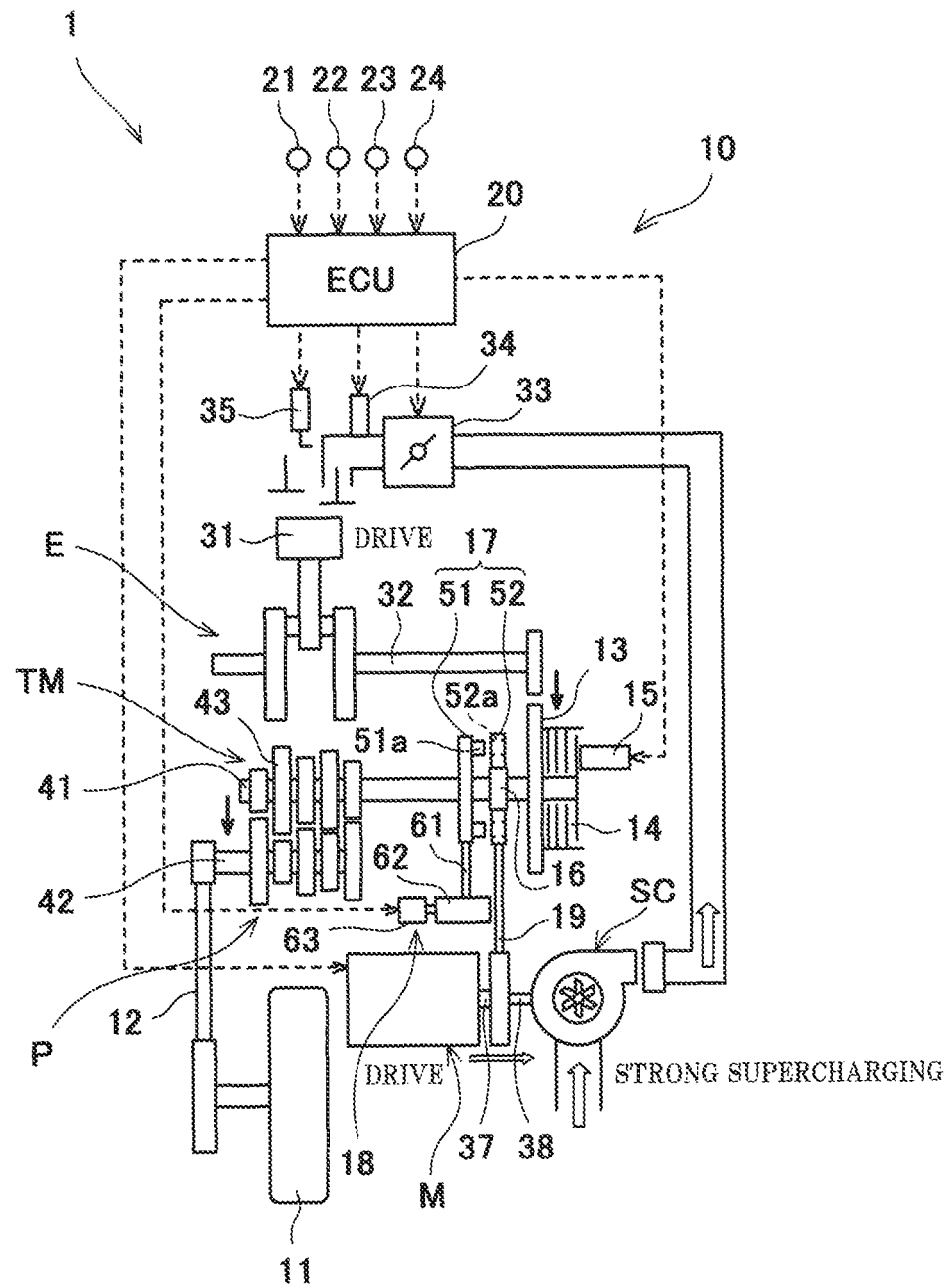
FIG. 2 is a schematic diagram showing an engine supercharging mode of the traveling drive system shown in FIG. 1.

FIG. 2 shows the engine supercharging mode. As shown in FIG. 2, in the engine supercharging mode, the controller 20 controls the main clutch actuator 15 to make the main clutch 14 become the engaged state, controls the switching clutch actuator 18 to make the switching clutch 17 become the disengaged state, controls the engine E to make the engine E become the driving state based on the detected value of the accelerator operation amount sensor 21, and controls the electric motor M to make the electric motor M become the driving state. The rotational frequency of the engine E is, for example, less than 12,000 rpm. The electric motor M is driven at a predetermined high rotational frequency (6,000 to 15,000 rpm, for example) so as to drive the supercharger SC. The rotational frequency of the electric motor M in the engine supercharging mode is higher than each of the rotational frequency of the electric motor M in the below-described HEV mode and the rotational frequency of the electric motor M in the below-described EV mode.

With this, the driving power of the engine E is transmitted to the driving wheel 11 through the primary reduction gear 13, the main clutch 14, the input shaft 41, the transmission gear train 43, the output shaft 42, and the output transmitting member 12. Moreover, the electric motor M is driven such that the rotational frequency (6,000 to 15,000 rpm, for example) of the electric motor M becomes higher than the rotational frequency of the input shaft 41. Therefore, the supercharger input shaft 38 is driven by the motor driving shaft 37, and with this, the supercharger SC performs strong supercharging with respect to the engine E.

At this time, the rotational frequency of the power transmitted from the motor driving shaft 37 through the power transmitting mechanism 19 to the outer ring of the one-way clutch 16 is higher than the rotational frequency of the power transmitted from the engine E through the input shaft 41 to the inner ring of the one-way clutch 16. Therefore, the power transmission from the motor driving shaft 37 to the input shaft 41 through the power transmitting mechanism 19 is blocked by the one-way clutch 16. To be specific, most of the driving power of the electric motor M is transmitted to the supercharger SC.

Figure 3:
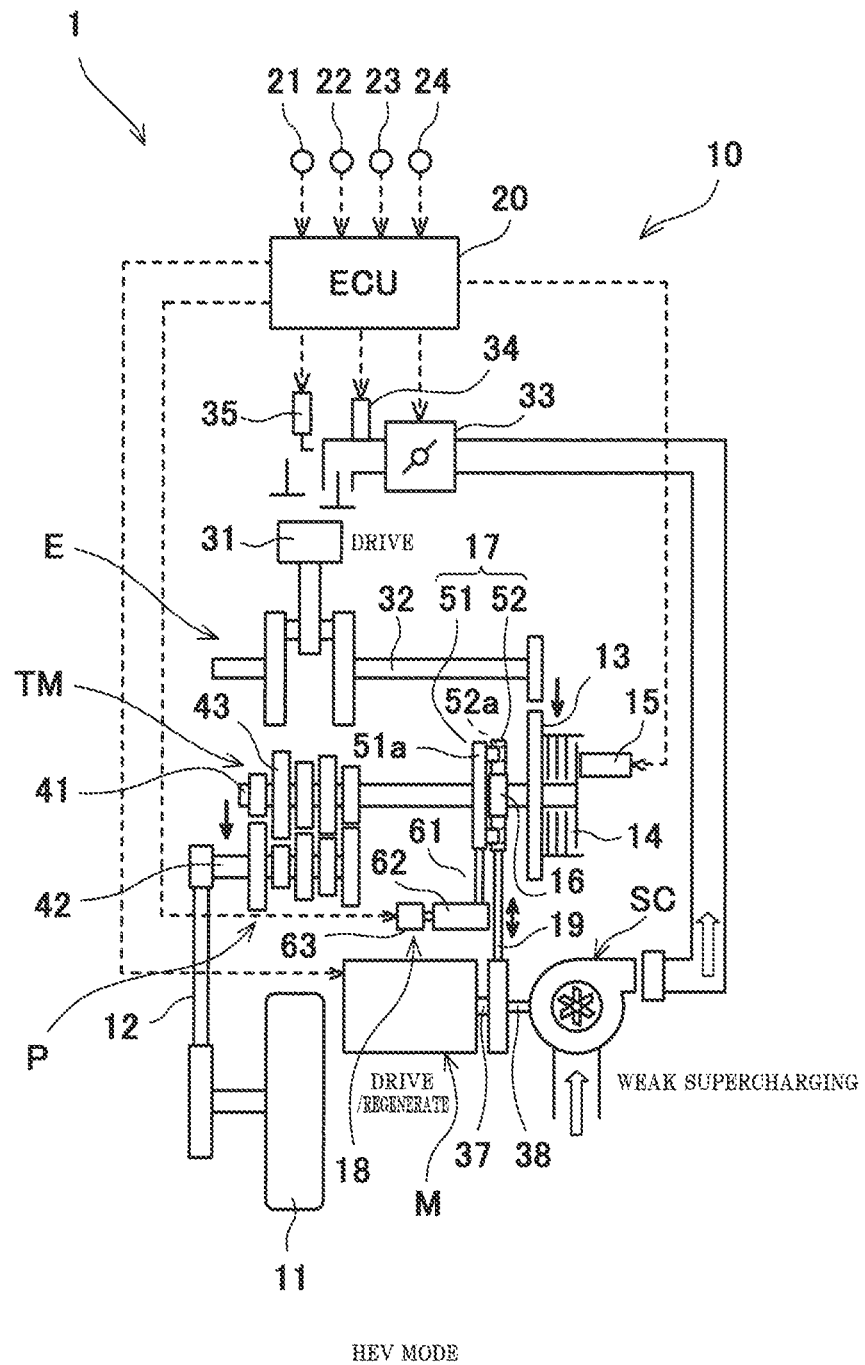
FIG. 3 is a schematic diagram showing a HEV mode of the traveling drive system shown in FIG. 1.

FIG. 3 shows the HEV mode. As shown in FIG. 3, in the HEV mode, the controller 20 controls the main clutch actuator 15 to make the main clutch 14 become the engaged state, controls the switching clutch actuator 18 to make the switching clutch 17 become the engaged state, controls the engine E to make the engine E become the driving state based on the detected value of the accelerator operation amount sensor 21, and controls the electric motor M to make the electric motor M become the driving state based on the detected value of the accelerator operation amount sensor 21. The rotational frequency of the engine E is, for example, less than 12,000 rpm.

With this, the driving power of the engine E is transmitted to the driving wheel 11 through the primary reduction gear 13, the main clutch 14, the input shaft 41, the transmission gear train 43, the output shaft 42, and the output transmitting member 12. Moreover, the driving power of the motor driving shaft 37 of the electric motor M is transmitted to the input shaft 41 through the power transmitting mechanism 19 and the switching clutch 17 and then transmitted to the driving wheel 11. To be specific, at the input shaft 41, the driving power of the electric motor M is superimposed on the driving power of the engine E.

Moreover, when the moving machine 1 decelerates, the controller 20 controls the electric motor M to make the electric motor M become the regenerating state. Therefore, traveling inertial force transmitted from the driving wheel 11 to the input shaft 41 when the moving machine 1 decelerates is transmitted through the switching clutch 17 and the power transmitting mechanism 19 to the motor driving shaft 37, and with this, the electric motor M generates electricity. The rotation of the motor driving shaft 37 is also transmitted to the supercharger input shaft 38. However, since the rotational frequency of the motor driving shaft 37 and the rotational frequency of the supercharger input shaft 38 are not high (less than 5,500 rpm, for example), the supercharger SC performs weak supercharging.

Figure 4:
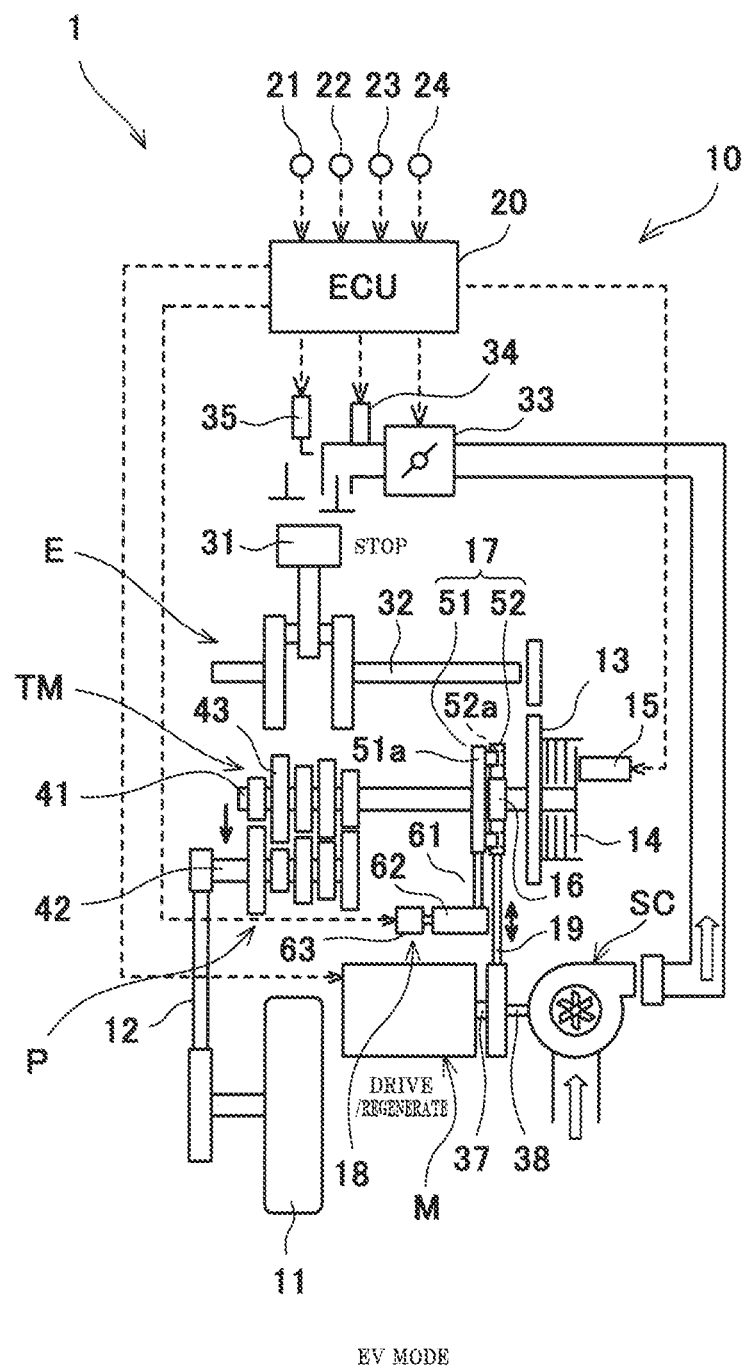
FIG. 4 is a schematic diagram showing an EV mode of the traveling drive system shown in FIG. 1.

FIG. 4 shows the EV mode. As shown in FIG. 4, in the EV mode, the controller 20 controls the main clutch actuator 15 to make the main clutch 14 become a disengaged state, controls the switching clutch actuator 18 to make the switching clutch 17 become the engaged state, controls the engine E to make the engine E become a stop state, and controls the electric motor M to make the electric motor M become the driving state based on the detected value of the accelerator operation amount sensor 21. The rotational frequency of the electric motor M is, for example, less than 5,500 rpm.

With this, the driving power of the motor driving shaft 37 of the electric motor M is transmitted to the input shaft 41 through the power transmitting mechanism 19 and the switching clutch 17 and then transmitted to the driving wheel 11. At this time, since the main clutch 14 is in the disengaged state, the engine E is prevented from becoming resistance to the driving of the electric motor M.

Moreover, when the moving machine 1 decelerates, the controller 20 controls the electric motor M to make the electric motor M become the regenerating state. Therefore, the traveling inertial force transmitted from the driving wheel 11 to the input shaft 41 when the moving machine 1 decelerates is transmitted through the switching clutch 17 and the power transmitting mechanism 19 to the motor driving shaft 37, and with this, the electric motor M generates electricity. The rotation of the motor driving shaft 37 is also transmitted to the supercharger input shaft 38. However, since the rotational frequency of the motor driving shaft 37 and the rotational frequency of the supercharger input shaft 38 are not high (less than 5,500 rpm, for example), the supercharger SC performs weak supercharging.

Figure 5:
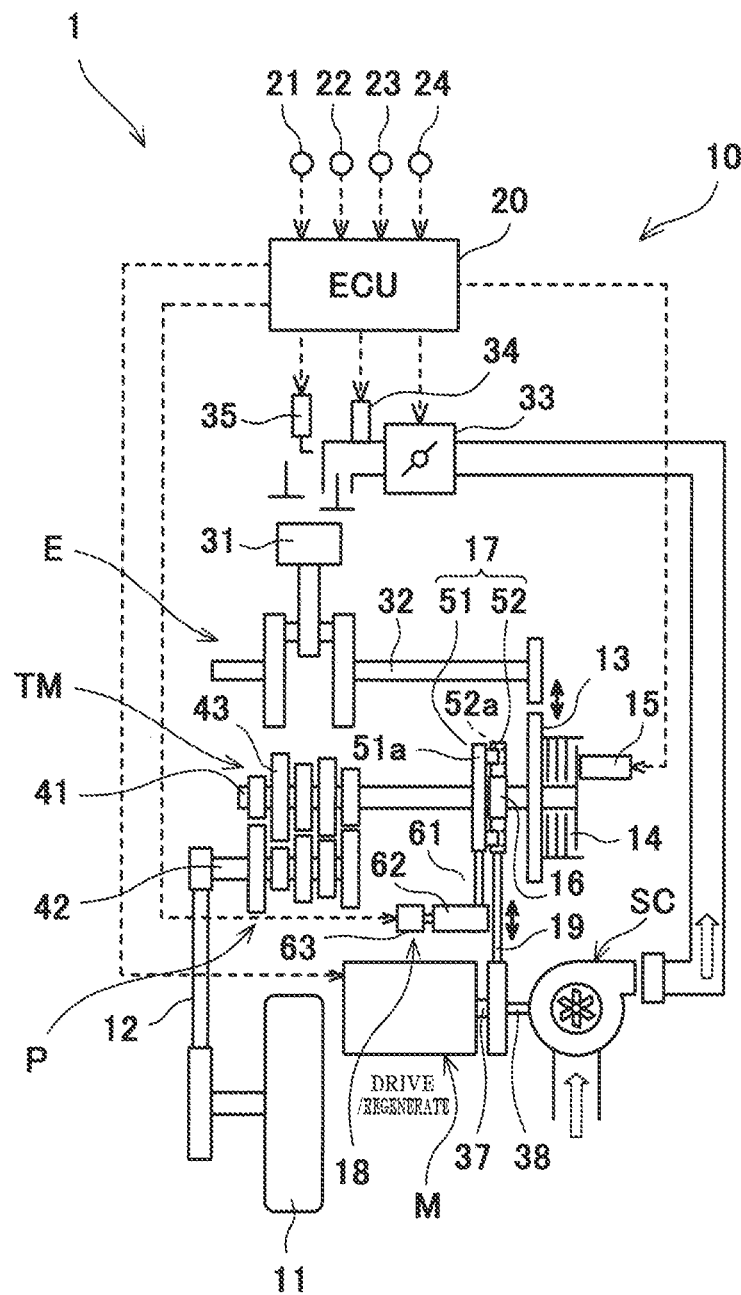
FIG. 5 is a schematic diagram showing an engine start mode and electricity generation mode of the traveling drive system shown in FIG. 1.

FIG. 5 shows the engine start mode and the electricity generation mode. As shown in FIG. 5, in the engine start mode, the controller 20 controls the main clutch actuator 15 to make the main clutch 14 become the engaged state, controls the switching clutch actuator 18 to make the switching clutch 17 become the engaged state, controls the electric motor M to make the electric motor M drive in accordance with an engine start command of the driver, and controls the engine E to make the engine E start in accordance with the engine start command. With this, the electric motor M can be made to serve as a starter motor for the engine E, and therefore, a starter motor dedicated for the start of the engine can be omitted.

Moreover, in the electricity generation mode, the controller 20 controls the main clutch actuator 15 to make the main clutch 14 become the engaged state, controls the switching clutch actuator 18 to make the switching clutch 17 become the engaged state, controls the electric motor M to make the electric motor M become the regenerating state in accordance with an electricity generation command of the driver, and controls the engine E to make the engine E drive at a predetermined rotational frequency in accordance with the electricity generation command. With this, without making the moving machine 1 travel, the electric motor M can be made to generate electricity by the driving power of the engine E, and thus, the electricity can be obtained.

According to the above configuration, in the engine supercharging mode in which the intake pressure of the engine E is increased by the supercharger SC, the power generated by the electric motor M is not transmitted to the input shaft 41 by the switching clutch 17, and the supercharger SC is appropriately driven. On the other hand, in an electric traveling mode (the HEV mode or the EV mode) in which the electric motor M is used as the traveling drive source, the driving power of the electric motor M is transmitted to the input shaft 41 through the switching clutch 17, and the driving power of the electric motor M is transmitted to the driving wheel 11. Therefore, in the moving machine 1 equipped with the electric supercharger SC, since the electric motor M which drives the supercharger SC also serves as the traveling drive source, the increase in weight and the deterioration of the degree of freedom of the layout can be suppressed.

Moreover, since the switching clutch 17 is a dog clutch arranged around the axis of the input shaft 41, the switching clutch 17 is efficiently arranged, and the deterioration of the degree of freedom of the layout can be further suppressed.

When the switching clutch 17 is in the disengaged state, the one-way clutch 16 blocks the power transmission from the electric motor M to the input shaft 41 and allows the power transmission from the input shaft 41 to the electric motor M. Therefore, the electric motor M can achieve both a driving function of driving the supercharger SC and a regenerating function of generating electricity by the power of the engine E.

Specifically, in the engine supercharging mode in which the intake pressure of the engine E is increased by the supercharger SC, the driving power generated by the electric motor M is not transmitted to the input shaft 41 by the switching clutch 17 and the one-way clutch 16, and the supercharger SC is appropriately driven. On the other hand, in a regenerating mode in which the electric motor M is utilized as the electricity generator, the power of the engine E is transmitted from the input shaft 41 through the one-way clutch 16 to the electric motor M, and the electric motor M generates electricity. Therefore, in the moving machine 1 equipped with the electric supercharger SC, an alternator attached to the engine E can be omitted.

According to the configuration in which the one-way clutch 16 is provided, in the engine supercharging mode, when the switching clutch 17 is in the disengaged state, the power generated by the electric motor M is not transmitted to the input shaft 41, and the supercharger SC is appropriately driven. On the other hand, in the electric traveling mode (the HEV mode or the EV mode) in which the electric motor M is utilized as the traveling drive source, the switching clutch 17 becomes the engaged state while bypassing the one-way clutch 16. Therefore, regardless of the existence of the one-way clutch 16, the driving power of the electric motor M is transmitted to the input shaft 41, and therefore, the input shaft 41 can be driven by the electric motor M.

Embodiment 2

Figure 6:
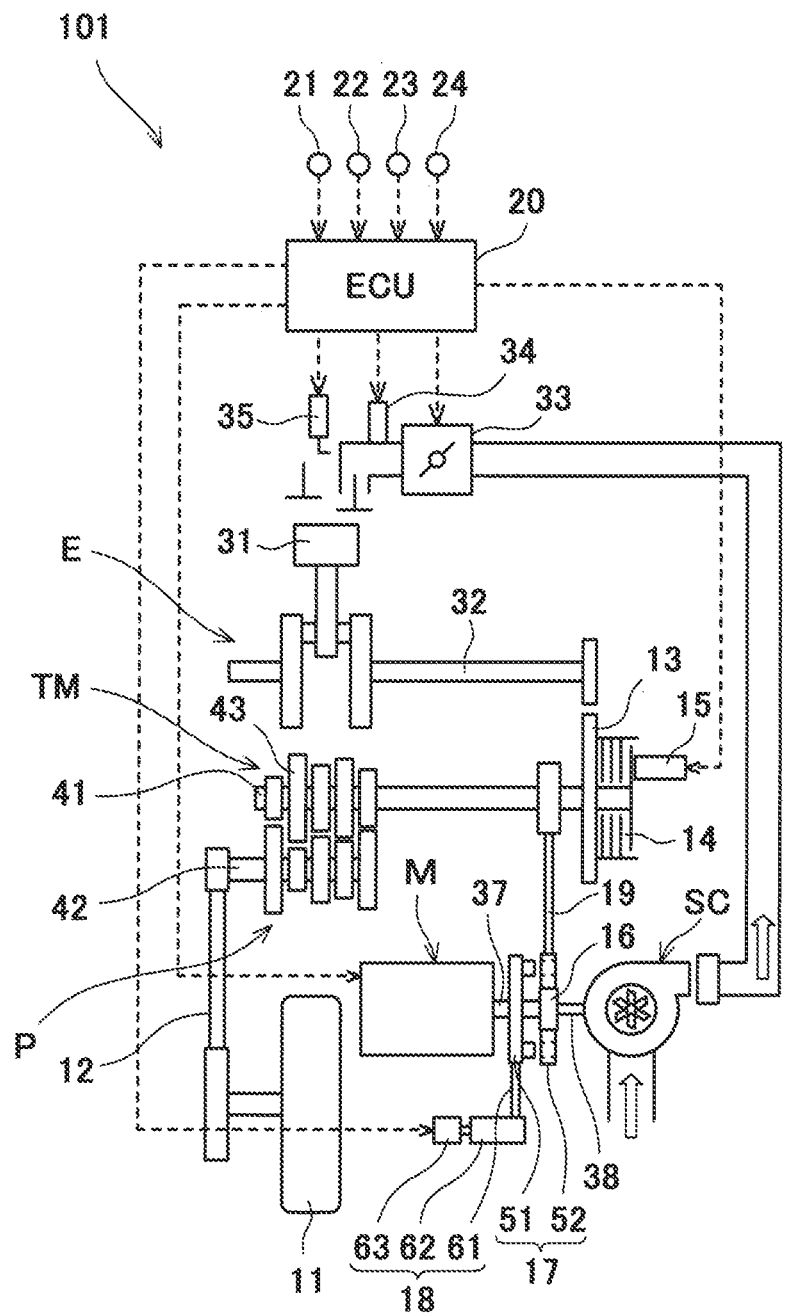
FIG. 6 is a schematic diagram showing the traveling drive system of the electric supercharger-equipped moving machine according to Embodiment 2.

FIG. 6 is a schematic diagram showing a traveling drive system of an electric supercharger-equipped moving machine 101 according to Embodiment 2. It should be noted that the same reference signs are used for the same components as in Embodiment 1, and the repetition of the same explanation is avoided. As shown in FIG. 6, in the moving machine 101 according to Embodiment 2, the one-way clutch 16 and the switching clutch 17 are arranged around the axis of the motor driving shaft 37, instead of around the axis of the input shaft 41.

The one-way clutch 16 and the switching clutch 17 are the same in configuration as those in Embodiment 1. The one-way clutch 16 blocks the power transmission from the motor driving shaft 37 to the power transmitting mechanism 19 and allows the power transmission from the power transmitting mechanism 19 to the motor driving shaft 37. The switching clutch 17 is provided at the motor driving shaft 37 so as to block or allow the power transmission from the electric motor M to the power transmitting mechanism 19.

According to this configuration, in the engine supercharging mode, the driving power of the electric motor M is not transmitted to the power transmitting mechanism 19 located between the one-way clutch 16 and the input shaft 41, and therefore, energy loss can be made smaller than when the one-way clutch 16 is provided at the input shaft 41. It should be noted that the other components are the same as those in Embodiment 1, explanations thereof are omitted.

It should be noted that in each of the embodiments, the one-way clutch 16 may be omitted. Specifically, the switching clutch 17 may be configured such that: the first rotating body 51 is connected to the input shaft 41 (or the motor driving shaft 37) so as to rotate together with the input shaft 41 (or the motor driving shaft 37) about the axis of the input shaft 41 (or the motor driving shaft 37) and slide in the axial direction of the input shaft 41 (or the motor driving shaft 37); and the second rotating body 52 is be externally fitted to the input shaft 41 (or the motor driving shaft 37) so as to be rotatable relative to the input shaft 41 (or the motor driving shaft 37) about the axis of the input shaft 41 (or the motor driving shaft 37).

The present invention is not limited to the above embodiments. Modifications, additions, and eliminations may be made with respect to the configurations of the embodiments. For example, some of components in one embodiment may be separated and arbitrarily extracted from the other components in the embodiment, and some of components in one embodiment may be applied to the other embodiment.

What is claimed is:

1. An electric supercharger-equipped moving machine comprising:
    an engine;
    a transmission including an input shaft, an output shaft, and a transmission gear train, the transmission being configured to change a rotational speed of driving power output from the engine;
    a supercharger configured to increase intake pressure of the engine;
    an electric motor including a motor driving shaft;
    a power transmitting path including the input shaft through which driving power of the engine is transmitted to a propulsive power generating body; and
    a switching clutch configured to be able to block power transmission from the electric motor to the input shaft, wherein:
    the motor driving shaft is connected to the supercharger so as to be able to drive the supercharger when the switching clutch is in a disengaged state; and
    the motor driving shaft is connected to the input shaft so as to be able to drive the propulsive power generating body when the switching clutch is in an engaged state.

2. The electric supercharger-equipped moving machine according to claim 1, further comprising:
    a clutch actuator configured to operate the switching clutch; and
    a controller configured to control the engine, the electric motor, and the clutch actuator, wherein
    the controller is configured to be able to execute:
        an engine supercharging mode in which the controller controls the engine and the electric motor to make the engine and the electric motor drive and controls the clutch actuator to make the switching clutch become the disengaged state; and
        an electric traveling mode in which the controller controls the electric motor to make the electric motor drive and controls the clutch actuator to make the switching clutch become the engaged state.

3. The electric supercharger-equipped moving machine according to claim 2, wherein the electric traveling mode is:
    a HEV mode in which the controller controls the engine and the electric motor to make the engine and the electric motor drive and controls the clutch actuator to make the switching clutch become the engaged state; or
    an EV mode in which the controller controls the engine and the electric motor to make the engine stop and make the electric motor drive and controls the clutch actuator to make the switching clutch become the engaged state.

4. The electric supercharger-equipped moving machine according to claim 2, wherein when the engine is in a stop state, and a predetermined engine start command is generated, the controller controls the clutch actuator to make the switching clutch become the engaged state and controls the electric motor to make the electric motor drive.

5. The electric supercharger-equipped moving machine according to claim 1, further comprising a main clutch through which a driving power of the engine is input to the input shaft.

6. The electric supercharger-equipped moving machine according to claim 5, further comprising a main clutch actuator that operates the main clutch such that the main clutch cuts or establishes the power transmitting path from the engine to the input shaft.

7. The electric supercharger-equipped moving machine according to claim 1, further comprising a primary reduction gear through which a driving power of the engine is input to the input shaft.

8. The electric supercharger-equipped moving machine according to claim 1, wherein the propulsive power generating body is a driving wheel.

9. An electric supercharger-equipped moving machine comprising:
    an engine;
    a supercharger configured to increase intake pressure of the engine;
    an electric motor including a motor driving shaft;
    a power transmitting path including a power transmitting shaft through which driving power of the engine is transmitted to a propulsive power generating body;
    a switching clutch configured to be able to block power transmission from the electric motor to the power transmitting shaft; and
    a one-way clutch configured to, when the switching clutch is in a disengaged state, block the power transmission from the electric motor to the power transmitting shaft and allow the power transmission from the power transmitting shaft to the electric motor, wherein
    the motor driving shaft is connected to the supercharger so as to be able to drive the supercharger when the switching clutch is in the disengaged state; and
    the motor driving shaft is connected to the power transmitting shaft so as to be able to drive the propulsive power generating body when the switching clutch is in an engaged state.

10. The electric supercharger-equipped moving machine according to claim 9, wherein the switching clutch is provided at the power transmitting path, while bypassing the one-way clutch, so as to be able to block or allow the power transmission between one side and the other side of the one-way clutch in the power transmitting path.

11. The electric supercharger-equipped moving machine according to claim 9, wherein the one-way clutch is arranged around an axis of the motor driving shaft.

12. The electric supercharger-equipped moving machine according to claim 9, wherein:
    the one-way clutch includes an inner ring located at the one side and an outer ring located at the other side;
    the inner ring is externally fitted to a rotating shaft so as to rotate together with the rotating shaft, the rotating shaft being the power transmitting shaft or the motor driving shaft;
    the switching clutch is a dog clutch; and
    the dog clutch includes a first rotating body including an engaging portion and connected to the rotating shaft so as to rotate together with the rotating shaft about an axis of the rotating shaft and
a second rotating body including an engaged portion and connected to the outer ring so as to rotate together with the outer ring about the axis of the rotating shaft.

13. The electric supercharger-equipped moving machine according to claim 9, further comprising:
a clutch actuator configured to operate the switching clutch; and
a controller configured to control the engine, the electric motor, and the clutch actuator, wherein
the controller is configured to be able to execute:
an engine electricity generation mode in which the controller controls the engine and the electric motor to make the engine drive and make the electric motor perform regeneration and controls the clutch actuator to make the switching clutch become the disengaged state;
an engine supercharging mode in which the controller controls the engine and the electric motor to make the engine and the electric motor drive and controls the clutch actuator to make the switching clutch become the disengaged state; and
an electric traveling mode in which the controller controls the electric motor to make the electric motor drive and controls the clutch actuator to make the switching clutch become the engaged state.

14. The electric supercharger-equipped moving machine according to claim 13, wherein the electric traveling mode is:
a HEV mode in which the controller controls the engine and the electric motor to make the engine and the electric motor drive and controls the clutch actuator to make the switching clutch become the engaged state; or
an EV mode in which the controller controls the engine and the electric motor to make the engine stop and make the electric motor drive and controls the clutch actuator to make the switching clutch become the engaged state.

15. The electric supercharger-equipped moving machine according to claim 13, wherein when the engine is in a stop state, and a predetermined engine start command is generated, the controller controls the clutch actuator to make the switching clutch become the engaged state and controls the electric motor to make the electric motor drive.

16. The electric supercharger-equipped moving machine according to claim 9, further comprising a main clutch through which a driving power of the engine is input to the power transmitting shaft.

17. The electric supercharger-equipped moving machine according to claim 16, further comprising a main clutch actuator that operates the main clutch such that the main clutch cuts or establishes the power transmitting path from the engine to the power transmitting shaft.

18. The electric supercharger-equipped moving machine according to claim 9, wherein
the propulsive power generating body is a driving wheel, and
the electric supercharger-equipped moving machine further comprising a primary reduction gear through which a driving power of the engine is input to the input shaft.

19. The electric supercharger-equipped moving machine according to claim 9, wherein the propulsive power generating body is a driving wheel.

* * * * *